United States Patent
Chang et al.

(10) Patent No.: US 10,271,341 B2
(45) Date of Patent: Apr. 23, 2019

(54) WIRELESS COMMUNICATION DEVICE AND ANTENNA CONTROL METHOD THEREOF

(71) Applicant: CHICONY ELECTRONICS CO., LTD., New Taipei (TW)

(72) Inventors: Chien-Yin Chang, New Taipei (TW); I-Ya Lu, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 15/833,612

(22) Filed: Dec. 6, 2017

(65) Prior Publication Data

US 2019/0069304 A1  Feb. 28, 2019

(30) Foreign Application Priority Data

Aug. 23, 2017  (TW) .............. 106128604 A

(51) Int. Cl.
| | |
|---|---|
| H04B 17/29 | (2015.01) |
| H04W 72/08 | (2009.01) |
| H04W 72/04 | (2009.01) |
| H04B 17/318 | (2015.01) |
| H04W 52/02 | (2009.01) |
| H04B 7/06 | (2006.01) |
| H04B 17/10 | (2015.01) |

(52) U.S. Cl.
CPC ........ *H04W 72/085* (2013.01); *H04B 7/0608* (2013.01); *H04B 17/318* (2015.01); *H04W 52/0274* (2013.01); *H04W 72/046* (2013.01); *H04B 17/104* (2015.01)

(58) Field of Classification Search
CPC ............. H04W 72/12; H04W 72/1215; H04W 52/0245; H04W 76/04; H04H 20/38
See application file for complete search history.

(56) References Cited

U.S. PATENT DOCUMENTS

| | | | |
|---|---|---|---|
| 2006/0002319 A1* | 1/2006 | Lee ...................... | H04B 7/0608 370/310.1 |
| 2006/0146834 A1* | 7/2006 | Baker ............... | H04W 36/0088 370/395.53 |
| 2008/0200195 A1 | 8/2008 | Abe et al. | |
| 2011/0019775 A1* | 1/2011 | Ruscitto ................ | H04B 7/084 375/340 |
| 2012/0134280 A1* | 5/2012 | Rotvold ................ | H04B 17/24 370/252 |

(Continued)

*Primary Examiner* — Khaled M Kassim
*Assistant Examiner* — Syed Ali
(74) *Attorney, Agent, or Firm* — Muncy, Geissler, Olds & Lowe, P.C.

(57) ABSTRACT

A wireless communication device and an antenna control method thereof are disclosed. The wireless communication device has a plurality of antennas, a received signal strength indicator detecting module and a control module. The wireless communication device signally communicates with an AP-router via the plurality of antennas. The received signal strength indicator detecting module individually detects a received signal strength indicator of each antenna and the AP-router. The control module assigns the antenna with the strongest received signal strength indicator among the plurality of antennas to be the main data transmission antenna and switches off at least one of the others of the plurality of antennas.

9 Claims, 5 Drawing Sheets

(56) References Cited

U.S. PATENT DOCUMENTS

| | | | |
|---|---|---|---|
| 2013/0030931 A1* | 1/2013 | Moshfeghi | G01S 19/48 705/16 |
| 2013/0176878 A1 | 7/2013 | Lee et al. | |
| 2014/0128032 A1 | 5/2014 | Muthukumar | |
| 2014/0233665 A1 | 8/2014 | Clevorn et al. | |
| 2015/0026647 A1* | 1/2015 | Park | G06F 3/0488 715/863 |
| 2016/0373944 A1* | 12/2016 | Jain | H04L 43/50 |
| 2017/0272183 A1* | 9/2017 | Matsuo | H04B 7/0695 |

* cited by examiner

WIRELESS COMMUNICATION DEVICE AND ANTENNA CONTROL METHOD THEREOF

BACKGROUND OF THE INVENTION

1. Field of the Invention

The present invention relates to a wireless communication device and an antenna control method thereof, particularly to a wireless communication device which assigns an antenna to be the main data transmission antenna by detecting a received signal strength indicator (RSSI) and switches off at least one of the others of the plurality of antennas, and an antenna control method thereof.

2. Description of the Related Art

A wireless communication device with a single antenna may be limited by the angle of arrival of received signals, resulting in poor connection and a low transmission rate. Currently, in order to ensure the widest coverage, a plurality of antennas is used in a wireless communication device to connect to a wireless base station or a wireless access point. When a plurality of antennas operates at the same time, the wireless communication device not only consumes more power but is prone to the problem of overheating. Accordingly, it is necessary to provide a new wireless communication device with a plurality of antennas which can take into account the quality and efficiency of signal transmission, reduce the power consumption of the wireless communication device, and avoid overheating of the wireless communication device during operation.

SUMMARY OF THE INVENTION

It is a major objective of the present invention to provide a wireless communication device which assigns an antenna to be the main data transmission antenna by detecting a received signal strength indicator (RSSI) and switches off at least one of the others of the plurality of antennas.

It is another objective of the present invention to provide a wireless communication device which assigns an antenna to be the main data transmission antenna by detecting an antenna received signal strength indicator (RSSI) and switches off at least one of the others of the plurality of antennas, and an antenna control method thereof.

To achieve the above objectives, the wireless communication device of the present invention can signally communicate with an AP-router. The wireless communication device includes a plurality of antennas, a received signal strength indicator detecting module, and a control module, wherein the wireless communication device signally communicates with the AP-router via the plurality of antennas. The received signal strength indicator detecting module is electrically connected to the antennas and detects a received signal strength indicator (RSSI) of each antenna and the AP-router. The control module is electrically connected to the received signal strength indicator detecting module. The control module assigns the antenna with the strongest received signal strength indicator (RSSI) among the plurality of antennas to be the main data transmission antenna and switches off at least one of the others of the plurality of antennas.

The present invention further provides an antenna control method used in a wireless communication device, wherein the wireless communication device includes a plurality of antennas and signally communicates with the AP-router via the plurality of antennas. The antenna control method thereof includes the following steps: detecting a received signal strength indicator (RSSI) of each antenna and the AP-router through a received signal strength indicator detecting module; assigning the antenna with the strongest received signal strength indicator (RSSI) among the plurality of antennas to be the main data transmission antenna through the control module according to the signal transmission strength indicators; assigning the antenna with the strongest received signal strength indicator (RSSI) to be the main data transmission antenna among the plurality of antennas through the control module; and switching off at least one of the others of the plurality of antennas, such that data of the wireless communication device is transmitted to the AP-router via the main data transmission antenna.

In the present invention, by detecting the antenna with the strongest received signal strength indicator (RSSI) in a wireless communication device and switching off the other antennas, the communication efficiency of the wireless communication device can be maintained and the objective of reducing the overall power consumption of the wireless communication device can be achieved. In addition, the probability that the operating temperature of the wireless communication device will be excessively high can be reduced.

DETAILED DESCRIPTION OF THE PREFERRED EMBODIMENT

Hereafter, the technical content of the present invention will be better understood with reference to preferred embodiments. Please refer to FIG. 1, which presents a hardware architecture diagram of a wireless communication device according to a first embodiment of the present invention.

Figure 1:
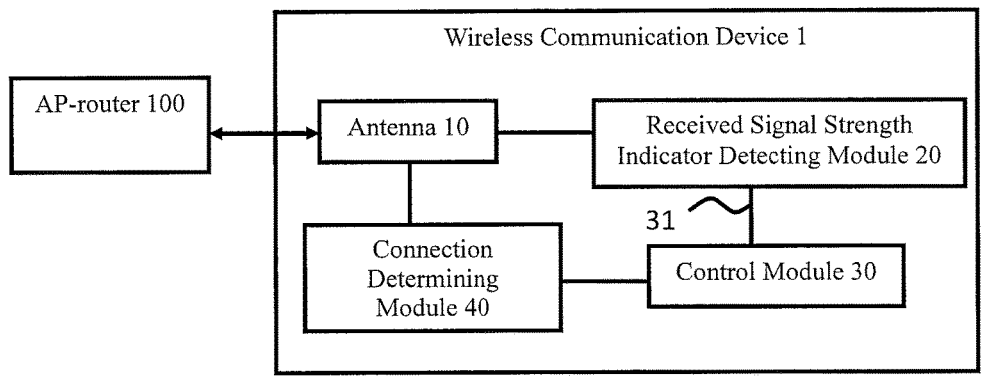
FIG. 1 is a hardware architecture diagram of a wireless communication device according to a first embodiment of the present invention.

A wireless communication device 1 of the present invention may be a tablet computer, surveillance camera, laptop, smart phone or other electronic device with a wireless communication device. As shown in FIG. 1, in the first embodiment, a wireless communication device 1 of the present invention includes a plurality of antennas 10, a received signal strength indicator detecting module 20, a control module 30, and a connection determining module 40. The received signal strength indicator detecting module 20 is electrically connected to the plurality of antennas 10. The control module 30 is electrically connected to the received signal strength indicator detecting module 20. The connection determining module 40 is electrically connected to the plurality of antennas 10 and the control module 30. According to an embodiment of the present invention, the wireless communication device 1 of the present invention is an IP CAM which signally communicates with the AP-router 100 via two of the antennas 10. Before the IP CAM is connected with the AP-router 100, the dual antenna design allows coverage of a wide-range, 360-degree signal receiving angle. Consequently, the IP CAM can be connected with the AP-router 100 more easily.

In the present embodiment, when the wireless communication device 1 is activated, the received signal strength indicator detecting module 20 detects a received signal strength indicator (RSSI) for each of the antennas 10 and the AP-router 100 to obtain the signal receiving status of each of the antennas 10 and the AP-router 100. Then the control module 30 assigns the antenna with the strongest received signal strength indicator from the received signal strength indicators detected by the received signal strength indicator detecting module 20 to be the main data transmission antenna. The control module 30 also switches off at least one of the others of the plurality of antennas 10, such that the wireless communication device 1 signally communicates with the AP-router 100 via the main data transmission antenna. This method not only reduces the power consumption of the wireless communication device 1 but avoids overheating of the wireless communication device 1.

The connection determining module 40 is used for determining whether the main data transmission antenna is disconnected from the AP-router 100. When the connection determining module 40 determines that the wireless communication device 1 is disconnected from the AP-router 100, the control module 30 will issue a signal detection command 31 to the received signal strength indicator detecting module 20, and the received signal strength indicator detecting module 20 then detects the received signal strength indicators of each of the antennas 10 and the AP-router 100. Then the control module 30 re-finds the antenna 10 with the strongest received signal strength indicator (RSSI), assigns the antenna 10 with the strongest received signal strength indicator (RSSI) among the plurality of antennas 10 to be the main data transmission antenna, and switches off at least one of the others of the plurality of antennas 10. Preferably, after assignment of the main data transmission antenna, switching off the others of the plurality of antennas 10 will achieve the best power saving effect. It should be noted that, according to an embodiment of the present invention, in the case that the wireless communication device 1 of the present invention is an IP CAM, which requires a data transmission bandwidth of 10 Mbps, only the antenna 10 with the strongest received signal strength indicator (RSSI) needs to be reserved to perform data transmission. According to an embodiment of the present invention, the received signal strength indicator detecting module 20, the control module 30, and the connection determining module 40 can be configured as a hardware device, a software program, firmware, or a combination thereof, or by a circuit loop or other suitable configuration, and can be integrated into a control chip within the wireless communication device 1.

Figure 2:
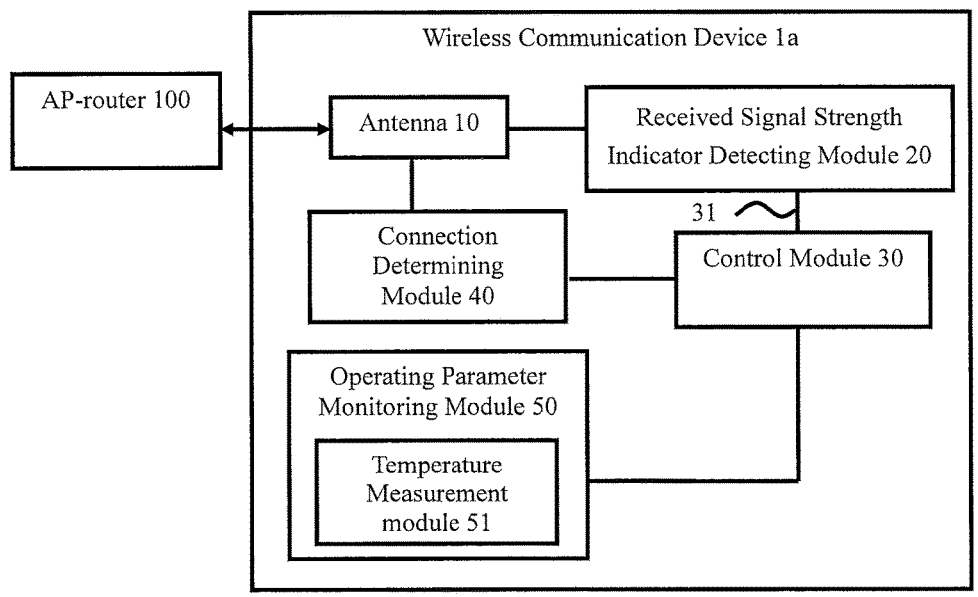
FIG. 2 is a hardware architecture diagram of a wireless communication device according to a second embodiment of the present invention.

Hereafter, please refer to FIG. 2, which illustrates a hardware architecture diagram of a wireless communication device according to a second embodiment of the present invention.

As shown in FIG. 2, in the second embodiment, besides the plurality of antennas 10, received signal strength indicator detecting module 20, control module 30, and connection determining module 40, the wireless communication device 1*a* of the present invention further includes an operating parameter monitoring module 50, which is electrically connected to the control module 30. The operating parameter monitoring module 50 monitors an operating parameter of the wireless communication device 1*a*. When the operating parameter exceeds a predetermined threshold, the control module 30 issues a signal detection command 31 to the received signal strength indicator detecting module 20. It should be noted here that the operating parameter may further include an operating temperature of the wireless communication device 1*a* and/or a sum of the current transmission flows between the plurality of antennas 10 and the AP-router 100. The predetermined threshold includes a temperature threshold and/or a current flow threshold.

In the present embodiment, the operating parameter monitoring module 50 monitors an operating temperature of the wireless communication device 1*a* through the temperature measurement module 51. When the operating temperature of the wireless communication device 1*a* exceeds the temperature threshold, the control module 30 issues the signal detection command 31 to the received signal strength indicator detecting module 20. After the wireless communication device 1*a* is activated, the temperature measurement module 51 begins to detect the operating temperature of the wireless communication device 1*a*. When the temperature measurement module 51 detects that the operating temperature of the wireless communication device 1*a* exceeds the temperature threshold, which indicates that the wireless communication device 1*a* is overheated, the operating temperature of the wireless communication device 1*a* can be reduced by switching off at least one of the plurality of the antennas 10. To reduce the operating temperature of the wireless communication device 1*a*, the control module 30 issues a signal detection command 31 to the received signal strength indicator detecting module 20, and then the received signal strength indicator detecting module 20 detects the signal transmission strength indicators of each of the antennas 10. After that, the control module 30 assigns the antenna 10 with the strongest received signal strength indicator (RSSI) among the plurality of antennas 10 to be the main data transmission antenna and switches off at least one of the others of the plurality of antennas 10. Then data is transmitted between the main data transmission antenna and the AP-router 100 to reduce the power consumption of the wireless communication device 1*a* and prevent overheating of the wireless communication device 1*a*. In a preferred embodiment, after assignment of the main data transmission antenna, switching off the others of the plurality of antennas 10 will achieve the best power saving effect.

It should be noted here that in the present embodiment, the temperature threshold is 45° C., but the present invention is not limited thereto. The temperature threshold may be changed depending on user requirements. According to an embodiment of the present invention, the operating parameter monitoring module 50 may be configured as a hardware device, a software program, a firmware, or a combination thereof, or as a circuit loop or other suitable configuration, and can be integrated into a control chip within the wireless communication device 1*a*. The temperature measurement module 51 is configured as hardware or firmware in combination with hardware for detecting the operating temperature of the wireless communication device 1*a*.

Figure 3:
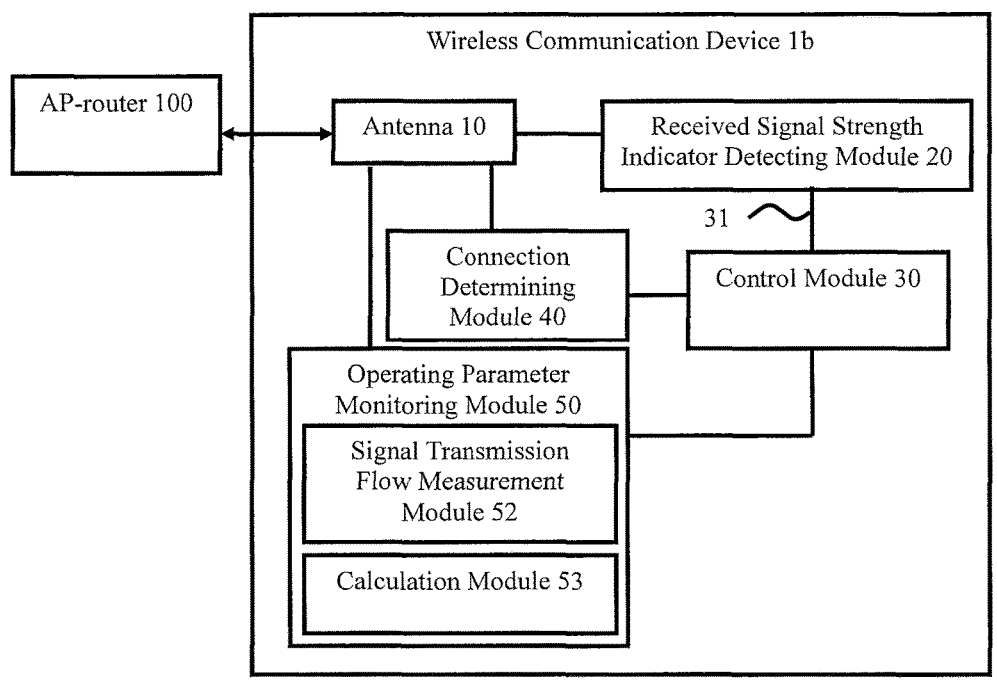
FIG. 3 is a hardware architecture diagram of a wireless communication device according to a third embodiment of the present invention.

Hereafter please refer to FIG. 3, which presents a hardware architecture diagram of a wireless communication device according to a third embodiment of the present invention.

As shown in FIG. 3, in the third embodiment, the operating parameter is the sum of the current transmission flows between the antennas 10 of the wireless communication device 1b and the AP-router 100, and the predetermined threshold is the current flow threshold. When the sum of the current transmission flows of the wireless communication device 1b exceeds the current flow threshold, the control module 30 issues the signal detection command 31 to the received signal strength indicator detecting module 20.

In the present embodiment, as shown in FIG. 3, the operating parameter monitoring module 50 includes a signal transmission flow measurement module 52 and a calculation module 53. The signal transmission flow measurement module 52 is electrically connected to each of the antennas 10. The calculation module 53 is electrically connected to the signal transmission flow measurement module 52 and the control module 30. After the wireless communication device 1b is activated, the signal transmission flow measurement module 52 detects the current transmission flows between each of the antennas 10 and the AP-router 100, and the calculation module 53 sums up the current transmission flows to obtain the sum of the current transmission flows between the wireless communication device 1b and the AP-router 100.

When the sum of the current transmission flows exceeds the current flow threshold, it means that a large amount of data is being transmitted between the wireless communication device 1b and the AP-router 100, as in the case of image data transmission. It also means that the wireless communication device 1b will consume more power. Thus, the control module 30 issues the signal detection command 31 to the received signal strength indicator detecting module 20, and then the received signal strength indicator detecting module 20 detects the signal transmission strength indicators of each of the antennas 10. After that, the control module 30 assigns the antenna 10 with the strongest received signal strength indicator (RSSI) among the plurality of antennas 10 to be the main data transmission antenna and switches off at least one of the others of the plurality of antennas 10, such that the main data transmission antenna signally communicates with the AP-router 100, thereby reducing the power consumption caused by concurrent activity of all of the plurality of antennas 10. Preferably, after assignment of the main data transmission antenna, switching off one of the others of the plurality of antennas 10 will achieve the best power saving effect. In the present embodiment, the current flow threshold is 5 Mbps, but the present invention is not limited thereto. The current flow threshold may be changed depending on user requirements.

According to an embodiment of the present invention, the signal transmission flow measurement module 52 and the calculation module 53 are integrated into a control chip within the wireless communication device 1b. It should be noted that according to an embodiment of the present invention, in the case that the wireless communication device 1 of the present invention is an IP CAM, which requires data transmission bandwidth of 10 Mbps, only the antenna 10 with the strongest received signal strength indicator (RSSI) needs to be reserved to perform data transmission.

Figure 4:
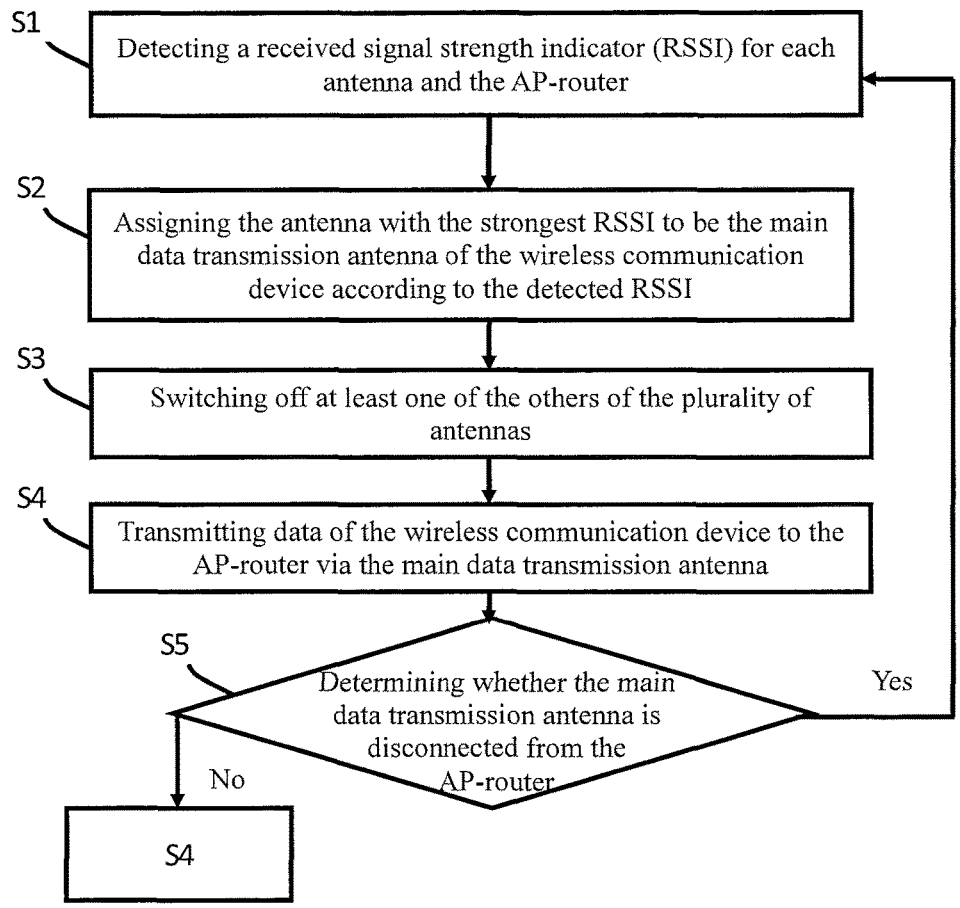
FIG. 4 is a flowchart showing steps in an antenna control method of a wireless communication device according to the first embodiment of the present invention.

Hereafter, please continue to refer to FIG. 1 together with FIG. 4, which is a flowchart showing the steps in an antenna control method of a wireless communication device according to the first embodiment of the present invention.

The method of controlling the antennas of the wireless communication device in the present invention, as shown in FIG. 1, is applicable to the wireless communication device 1, and the wireless communication device 1 can signally communicate with an AP-router 100. As shown in FIG. 4, the antenna control method of the present invention mainly includes Step S1 to Step S5. Each step in the method of controlling the antennas of a wireless communication device according to the first embodiment of the present invention will be described in detail hereafter.

Step S1: Detecting a received signal strength indicator (RSSI) for each antenna and the AP-router.

As shown in FIG. 1, when the wireless communication device 1 is activated, the received signal strength indicator detecting module 20 detects the received signal strength indicator (RSSI) of each of the antennas 10 and the AP-router 100 to obtain the signal receiving status of each of the antennas 10 and the AP-router 100.

Step S2: Assigning the antenna with the strongest received signal strength indicator (RSSI) to be the main data transmission antenna of the wireless communication device according to the detected received signal strength indicator (RSSI).

The control module 30 of the wireless communication device 1 assigns the one of the plurality of antennas 10 with the strongest received signal strength indicator (RSSI) from the received signal strength indicators obtained in Step S1 to be the main data transmission antenna to ensure the communication efficiency of the wireless communication device 1.

Step S3: Switching off at least one of the others of the plurality of antennas.

Step S4: Transmitting data of the wireless communication device to the AP-router via the main data transmission antenna.

Step S3 and S4 are performed at the same time, wherein the one of the plurality of antennas 10 with the strongest received signal strength indicator (RSSI) is assigned to be the main data transmission antenna by the control module 30. Consequently, the wireless communication device 1 signally communicates with the AP-router 100 via the assigned main data transmission antenna. Meanwhile, the control module 30 switches off at least one of the others of the plurality of antennas 10 in the wireless communication device 1 to reduce power consumption and thereby avoid overheating of the wireless communication device 1. It should be noted here that according to an embodiment of the present invention, when the wireless communication device 1 of the present invention is an IP CAM, only the antenna 10 with the strongest received signal strength indicator (main data transmission antenna) needs to be connected to the AP-router 100 to perform the data transmission because the bandwidth of the data transmission of an IP CAM is 10 Mbps.

Step S5: Determining whether the main data transmission antenna is disconnected from the AP-router.

The connection determining module 40 determines whether the main data transmission antenna is disconnected from the AP-router 100. When the connection determining module 40 determines that the wireless communication device 1 is disconnected from the AP-router 100, the control module 30 will issue a signal detection command 31 to the received signal strength indicator detecting module 20 to re-perform Step S1 to Step S4; when the connection determining module 40 determines that the wireless communication device 1 is not disconnected from the AP-router 100, the method continues with Step S4; i.e., the wireless communication device 1 keeps signally communicating with the AP-router 100 via the main data transmission antenna.

Figure 5:
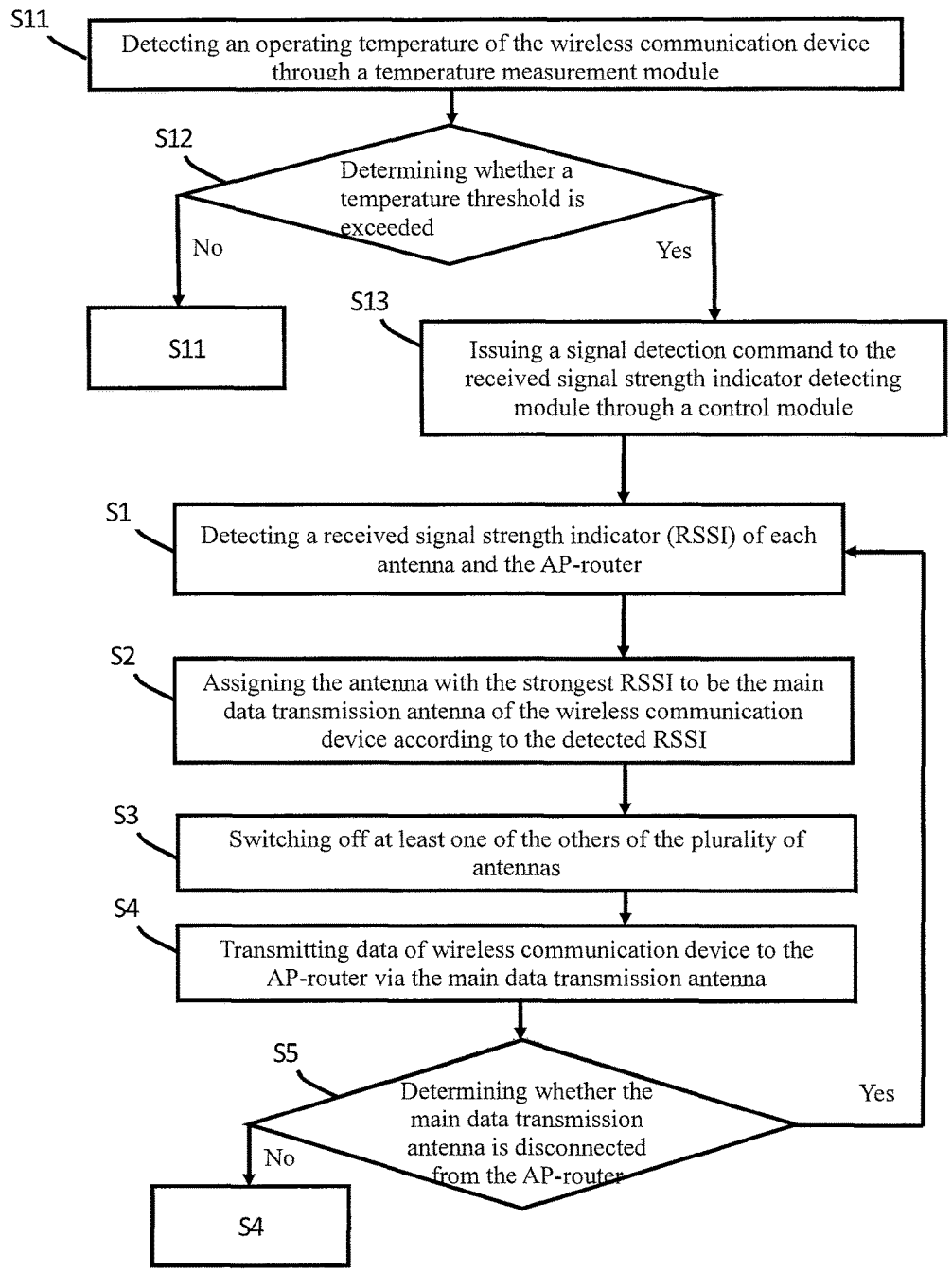
FIG. 5 is a flowchart showing steps in an antenna control method of a wireless communication device according to the second embodiment of the present invention.

Hereafter, please continue to refer to FIG. 2 together with FIG. 5, which is a flowchart showing steps in an antenna control method of a wireless communication device according to a second embodiment of the present invention. As shown in FIG. 5, the antenna control method in the second embodiment of the present invention is different from that in the first embodiment in that, in the second embodiment, before Step S1 is performed, the antenna control method of the present invention further includes Step S11 to Step S13, which will be described in detail hereafter.

Step S11: Detecting an operating temperature of the wireless communication device by a temperature measurement module.

After the wireless communication device 1a is activated, the operating parameter monitoring module 50 monitors the operating parameter of the wireless communication device 1a, wherein the operating parameter includes a wireless communication device 1a operating temperature and/or the sum of the current transmission flows between the plurality of antennas 10 and the AP-router 100. In the present embodiment, after the wireless communication device 1a is activated, the operating parameter monitoring module 50 monitors the operating temperature of the wireless communication device 1a through the temperature measurement module 51.

Step S12: Determining whether a temperature threshold is exceeded.

In the present embodiment, the operating parameter is the operating temperature of the wireless communication device, and thus the predetermined threshold is a temperature threshold. When the operating temperature of the wireless communication device 1a exceeds the temperature threshold, it means that the wireless communication device 1a is overheated; at this time, the method proceeds to Step S13. When the operating temperature is lower than the temperature threshold, it means that the wireless communication device 1a is not overheated; at this time, the method continues with Step S11; i.e., the temperature measurement module 51 keeps monitoring an operating temperature of the wireless communication device 1a. It should be noted here that in the present embodiment, the temperature threshold is 45° C., but the present invention is not limited thereto. The temperature threshold may be changed depending on user requirements.

Step S13: Issuing a signal detection command to the received signal strength indicator detecting module through a control module.

When the operating temperature of the wireless communication device 1a exceeds a temperature threshold, it means that the wireless communication device 1a is overheated. Switching off at least one of the plurality of the antennas 10 can reduce the power consumption of the wireless communication device 1a. At this time, the control module 30 issues the signal detection command 31 to the received signal strength indicator detecting module 20 in order to perform Step S1 to Step S5, thereby reducing the power consumption of the wireless communication device 1a and preventing overheating of the wireless communication device 1a.

Figure 6:
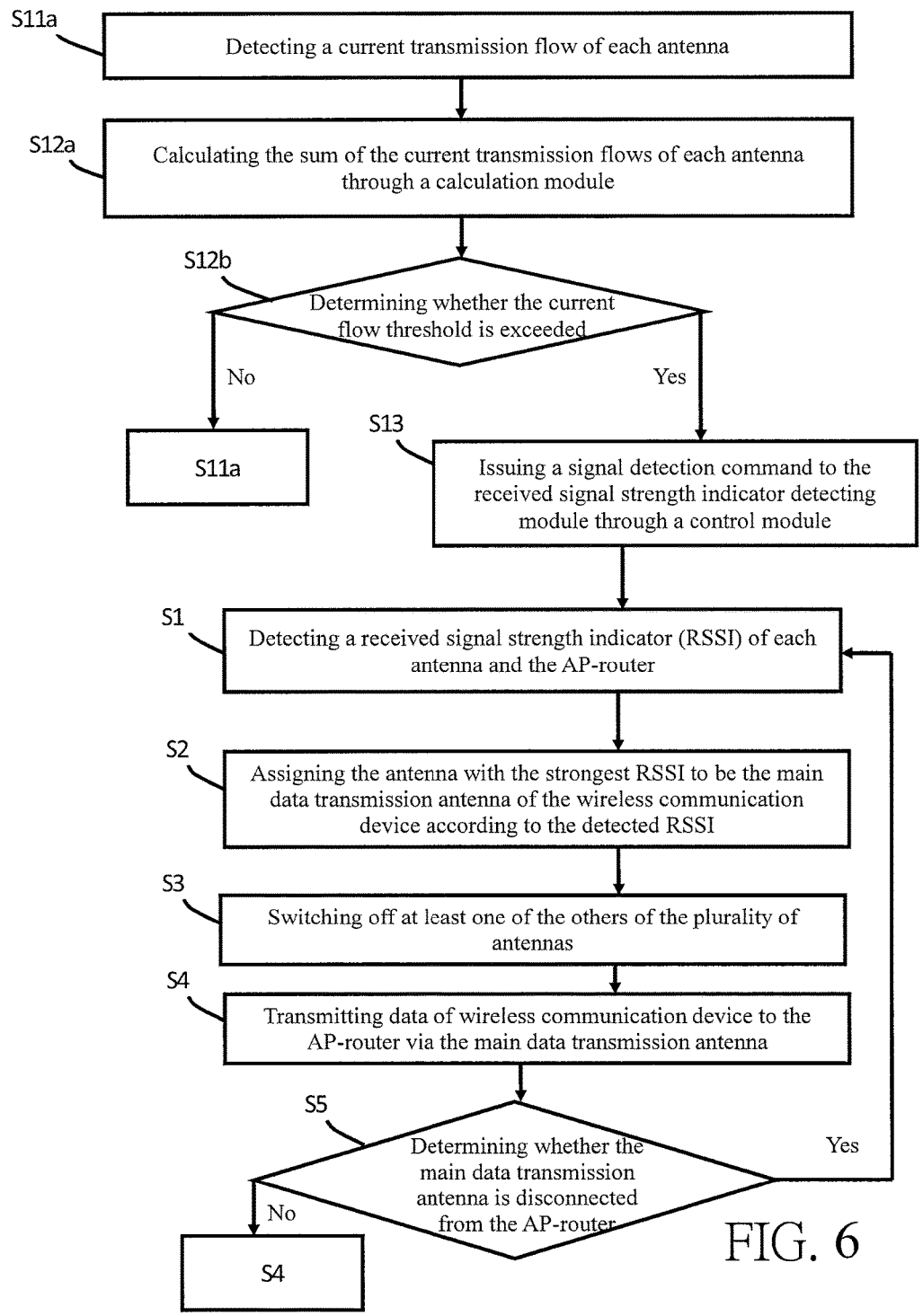
FIG. 6 is a flowchart showing steps in an antenna control method of a wireless communication device according to the third embodiment of the present invention the present invention.

Hereafter, please continue to refer to FIG. 3 together with FIG. 6, which is a flowchart showing steps in an antenna control method of a wireless communication device according to a third embodiment of the present invention. As shown in FIG. 6, the antenna control method of a wireless communication device according to the third embodiment of the present invention is different from the first embodiment in that, in the third embodiment, before Step S1 is performed, the antenna control method thereof in the present invention further includes Step S11a, Step S12a, Step S12b, and Step S13, which will be described in detail hereafter.

Step S11a: Detecting a current transmission flow of each antenna.

In the present embodiment, the operating parameter is the sum of the current transmission flows between the plurality of antennas 10 of the wireless communication device 1b and the AP-router 100. After the wireless communication device 1b is activated, the signal transmission flow measurement module 52 detects the current transmission flows between each of the antennas 10 and the AP-router 100.

Step S12a: Calculating the sum of the current transmission flows of each antenna by a calculation module.

The calculation module 53 sums up the current transmission flow to obtain the sum of the current transmission flows between the wireless communication device 1b and the AP-router 100.

Step S12b: Determining whether the current flow threshold is exceeded.

Since the operating parameter in the present embodiment is the sum of the current transmission flows between the plurality of antennas 10 and the AP-router 100, the predetermined threshold is the current transmission flow threshold. When the sum of the current transmission flows exceeds the current flow threshold, it means that a large amount of data is being transmitted between the wireless communication device 1b and the AP-router 100, and thus the wireless communication device 1b is in a high power-consumption state; at this time, the method proceeds to Step S13; when the sum of the current transmission flows does not exceed the current flow threshold, it means that the wireless communication device 1b works normally; at this time, the method continues with Step S11a. In the present embodiment, the current flow threshold is 5 Mbps, but the present invention is not limited thereto. The current flow threshold may be changed depending on user requirements.

Step S13: Issuing a signal detection command to the received signal strength indicator detecting module through the control module.

When the sum of the current transmission flows exceeds the current flow threshold, it means that a large amount of data is being transmitted between the wireless communication device 1b and the AP-router 100, as in the case of image data transmission, but this also means that the wireless communication device 1b will consume more power. At this time, the control module 30 issues a signal detection command 31 to the received signal strength indicator detecting module 20 in order to perform Step S1 to Step S5, thereby reducing the power consumption of the wireless communication device 1b caused by the transmission of data.

In the present invention, by detecting the antenna received signal strength indicator of the wireless communication device for assigning a main data transmission antenna and switching off at least one of the others of the plurality of antennas, the communication efficiency of the wireless communication devices 1, 1a, 1b can be maintained and the objective of reducing the overall power consumption of the wireless communication devices 1, 1a, 1b can be achieved. Meanwhile, according to whether the overall operating temperature of the wireless communication devices 1, 1a, 1b exceeds the temperature threshold, the main data transmission antenna can be assigned and at least one of the others of the plurality of antennas 10 can be switched off to reduce the power consumption caused by switching on all of the plurality of antennas 10 in the wireless communication devices 1, 1a, 1b and to prevent overheating of the wireless communication devices 1, 1a, 1b. When large amounts of data are transmitted by the wireless communication devices 1, 1a, 1b, assigning a main data transmission antenna and switching off at least one of the others of the plurality of antennas 10 can ensure that the data transmission efficiency of the wireless communication devices 1, 1a, 1b can be maintained and the power consumption of the wireless communication devices 1, 1a, 1b can be reduced.

It should be noted that the embodiments of the present invention described above are only illustrative and that the scope of the invention is defined solely by the appended claims.

What is claimed is:

1. A wireless communication device signally communicating with an AP-router comprising:
    a plurality of antennas, by which the wireless communication device signally communicates with the AP-router;
    a received signal strength indicator detecting module, which is electrically connected to the plurality of antennas and detects a received signal strength indicator (RSSI) of each of the antennas and the AP-router;
    a control module, electrically connected to the received signal strength indicator detecting module, which assigns the antenna with the strongest received signal strength indicator (RSSI) among the plurality of antennas to be a main data transmission antenna and switches off at least one of the others of the plurality of antennas, such that data transmission is performed between the main data transmission antenna and the AP-router;
    a temperature measurement module for detecting an operating temperature of the wireless communication device, wherein when the operating temperature exceeds a temperature threshold, the control module issues a signal detection command to the received signal strength indicator detecting module; and
    a signal transmission flow measurement module and a calculation module, the calculation module being electrically connected to the signal transmission flow measurement module and the control module, wherein the signal transmission flow measurement module detects current transmission flows between each of the antennas and the AP-router, and the calculation module obtains a sum of the current transmission flows by summing the transmission flow of each of the antennas; when the sum of the current transmission flows exceeds a current flow threshold, the control module issues the signal detection command to the received signal strength indicator detecting module.

2. The wireless communication device as claimed in claim 1, wherein the control module assigns the antenna with the strongest received signal strength indicator (RSSI) to be the main data transmission antenna among the plurality of antennas and switches off the others of the plurality of antennas, such that data transmission is performed between the main data transmission antenna and the AP-router.

3. The wireless communication device as claimed in claim 1, comprising an operating parameter monitoring module electrically connected to the control module for monitoring an operating parameter of the wireless communication device; when the operating parameter exceeds a predetermined threshold, the control module issues the signal detection command to the received signal strength indicator detecting module.

4. The wireless communication device as claimed in claim 3, wherein the operating parameter comprises the operating temperature of the wireless communication device and/or the sum of the current transmission flow between the plurality of antennas and the AP-router, and the predetermined threshold comprises the temperature threshold and/or the current flow threshold.

5. The wireless communication device as claimed in claim 1, further comprising a connection determining module individually electrically connected to the plurality of antennas and the control module, which is used for determining whether the main data transmission antenna is disconnected from the AP-router; when the main data transmission antenna is disconnected from the AP-router, the control module issues the signal detection command to the received signal strength indicator detecting module.

6. An antenna control method used in a wireless communication device comprising a plurality of antennas, and through the plurality of antennas, signally communicating with an AP-router, the antenna control method thereof comprising the steps of:
    detecting a received signal strength indicator of each of the plurality of antennas and the AP-router through a received signal strength indicator detecting module;
    assigning the antenna with the strongest received signal strength indicator (RSSI) to be a main data transmission antenna of the wireless communication device according to the received signal strength indicator through a control module; and
    switching off at least one of the others of the plurality of antennas, such that data of the wireless communication device is transmitted to the AP-router via the main data transmission antenna;
    detecting an operating temperature through a temperature measurement module;
    when the operating temperature exceeds a temperature threshold, issuing a signal detection command to the received signal strength indicator detecting module through the control module to detect the received signal strength indicator (RSSI) of each of the antennas;
    detecting a current transmission flow of each of the antennas through a signal transmission flow measurement module;
    summing up data transmission flows of each of the antennas to obtain a sum of current transmission flows through a calculation module; and
    when the sum of the current transmission flows exceeds the current flow threshold, issuing the signal detection command to the received signal strength indicator detecting module to detect the received signal strength indicators of each of the antennas through the control module.

7. The antenna control method for a wireless communication device as claimed in claim 6, wherein the control module assigns the antenna with the strongest received signal strength indicator (RSSI) to be the main data transmission antenna among the plurality of antennas and switches off the others of the plurality of antennas, such that data of the wireless communication device is transmitted to the AP-router via the main data transmission antenna.

8. The antenna control method for a wireless communication device as claimed in claim 6, wherein before detection of the received signal strength indicator of the plurality of antennas through the received signal strength indicator detecting module, the antenna control method thereof further comprises the steps of:
    monitoring an operating parameter of the wireless communication device through an operating parameter monitoring module; and when the operating parameter exceeds a predetermined threshold, the control module issues the signal detection command to the received signal strength indicator detecting module to detect the received signal strength indicators of each of the antennas.

9. The antenna control method for a wireless communication device as claimed in claim 6, wherein after data is transmitted between the main data transmission antenna signally communicating with the AP-router, the antenna control method thereof further comprises the steps of:

determining whether the main data transmission antenna is disconnected from the AP-router through a connection determining module; and when the main data transmission antenna is disconnected from the AP-router, issuing a signal detection command to the received signal strength indicator detecting module through the control module to re-detect the received signal strength indicators of each of the antennas and the AP-router, and assigning the antenna with the strongest received signal strength indicator (RSSI) to be the main data transmission antenna of the wireless communication device.

\* \* \* \* \*